Figure 2:
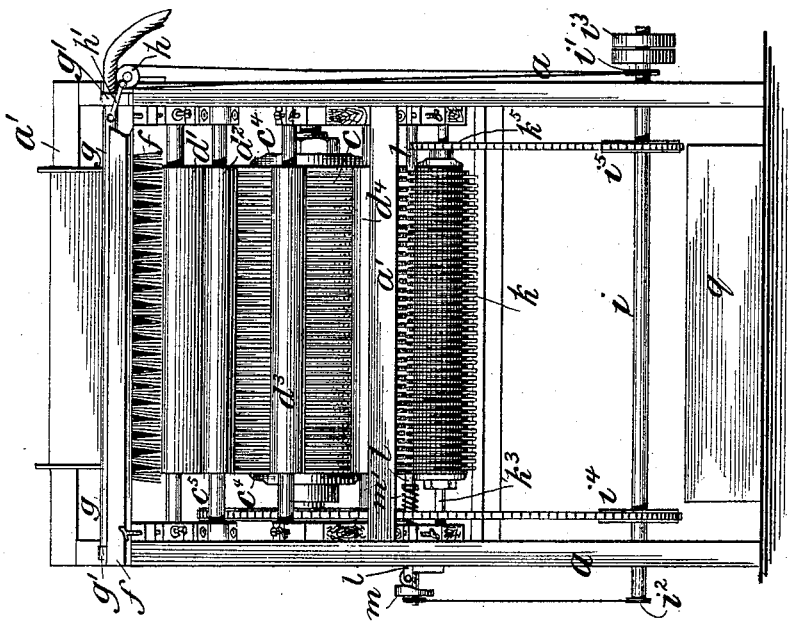

No. 619,693. Patented Feb. 14, 1899.
G. PETTIT, Jr.
FRUIT SEEDING MACHINE.
(Application filed Jan. 30, 1896.)
(No Model.) 4 Sheets—Sheet 1.

WITNESSES:
O. H. Hayword
E. G. Williams

INVENTOR
George Pettit Jr.
BY
Henry D. Williams
ATTORNEY

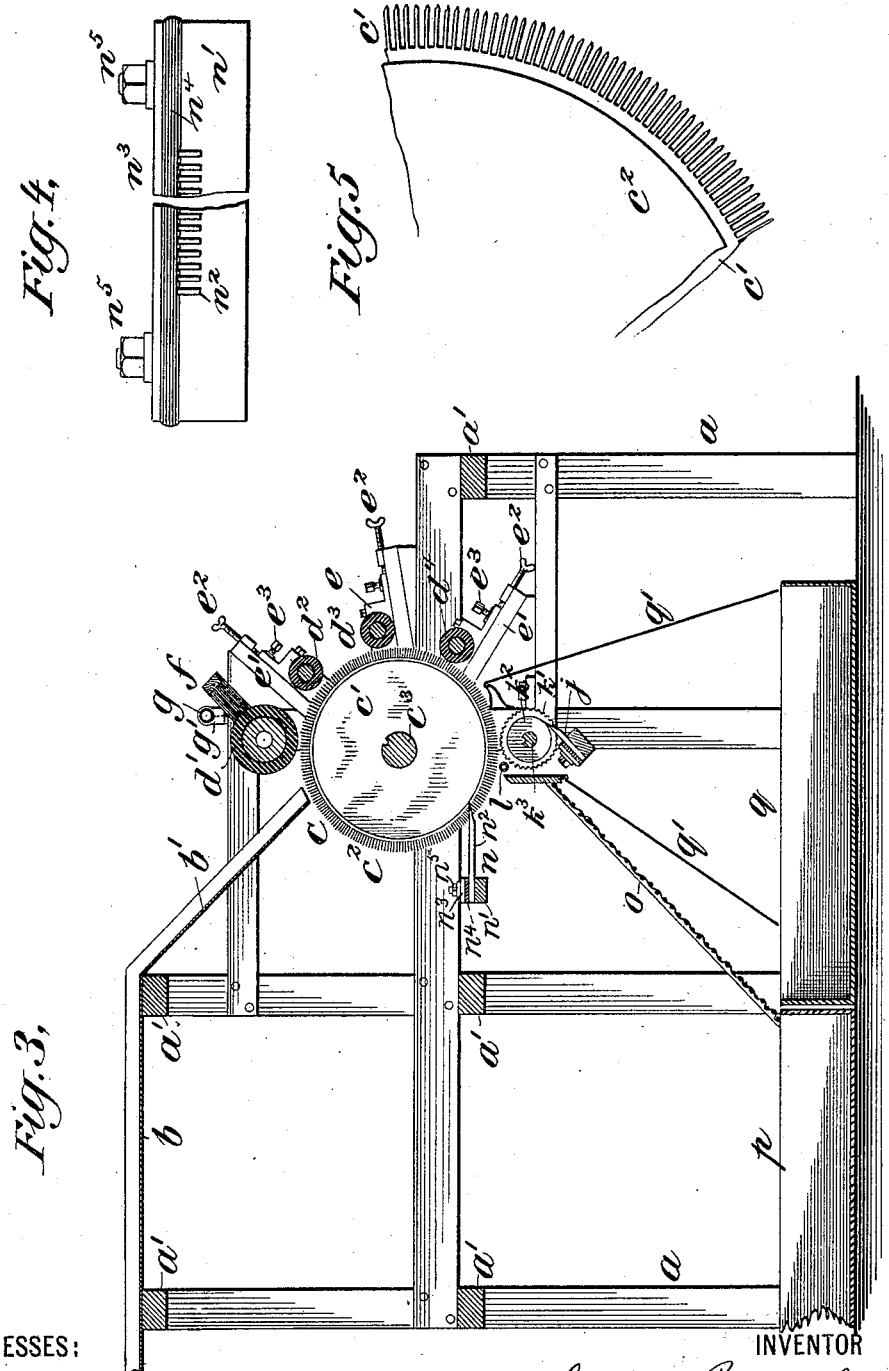

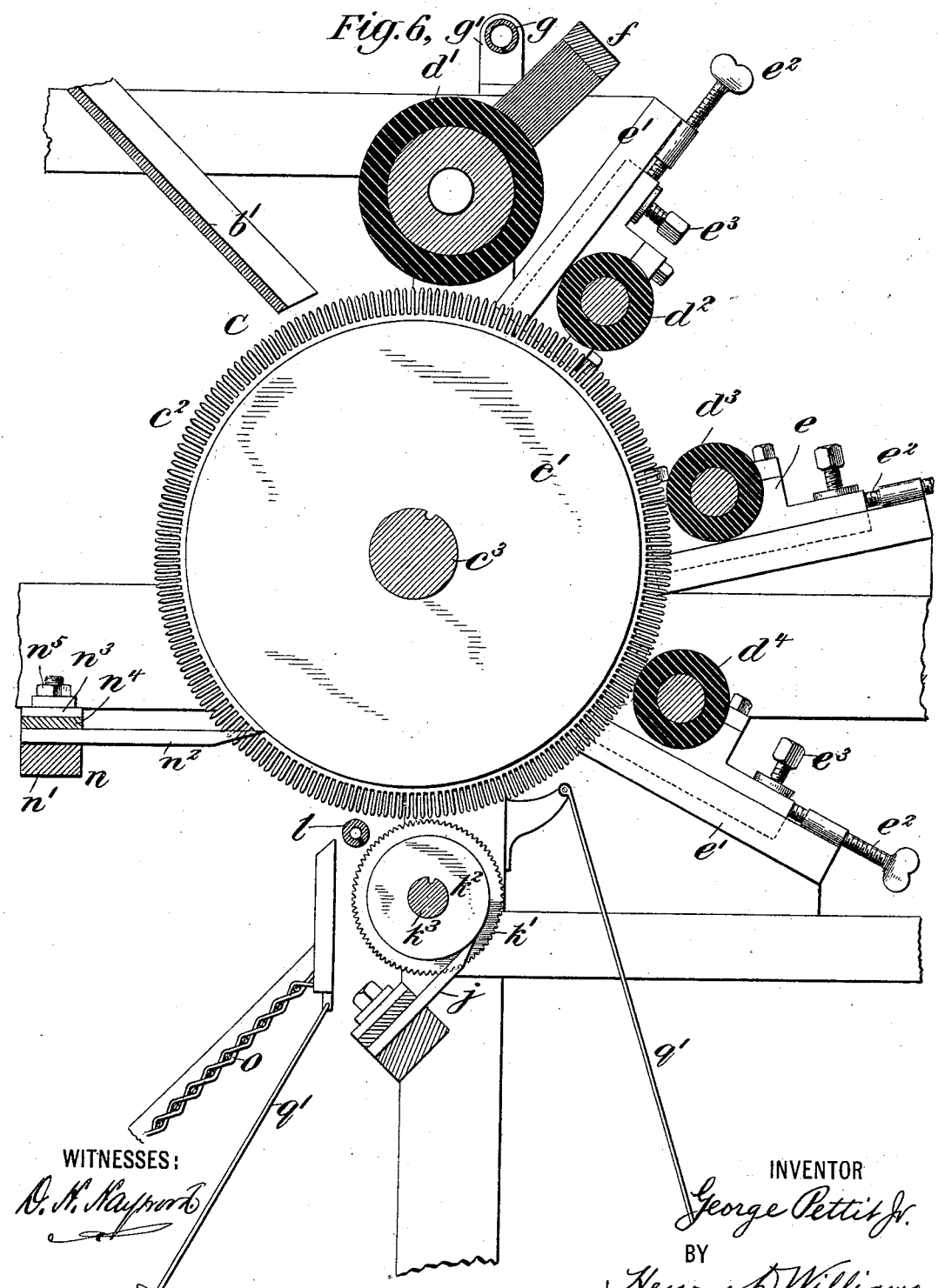

No. 619,693. Patented Feb. 14, 1899.
G. PETTIT, Jr.
FRUIT SEEDING MACHINE.
(Application filed Jan. 30, 1896.)
(No Model.) 4 Sheets—Sheet 4.
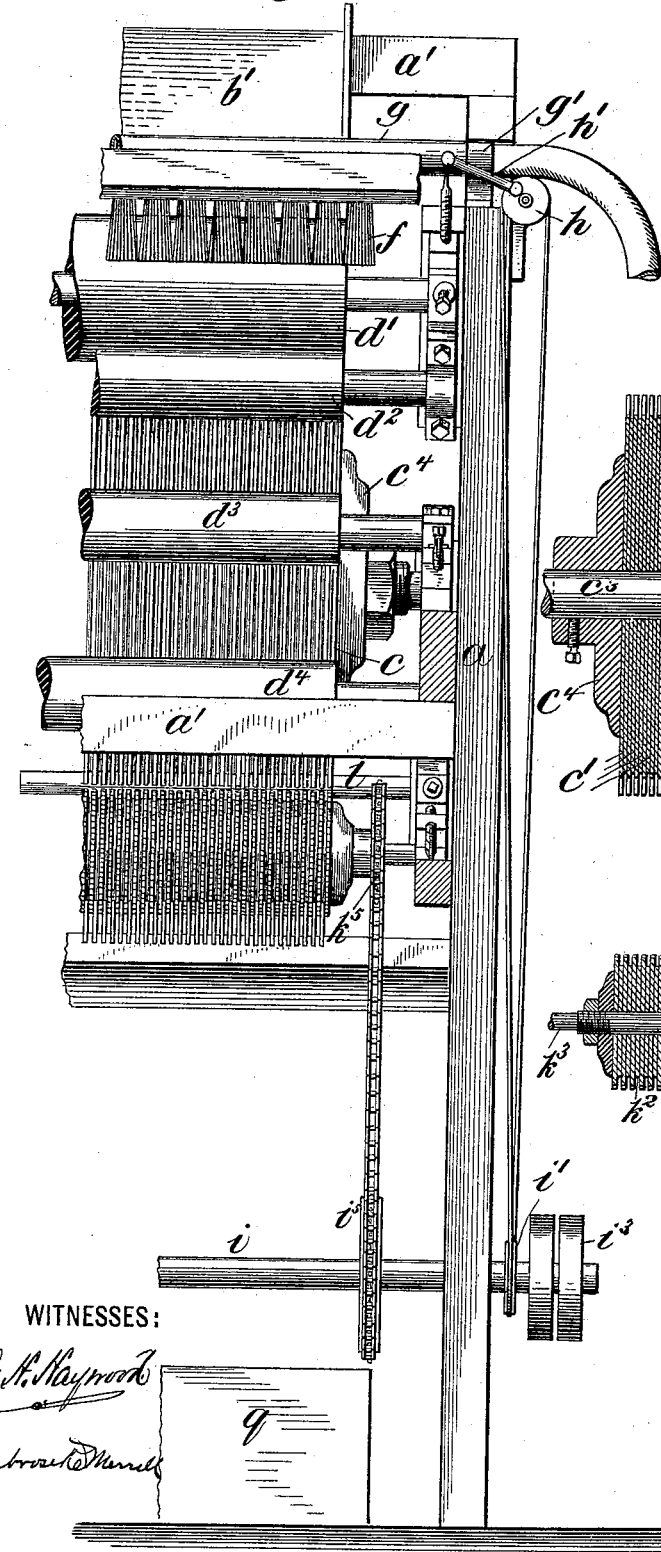
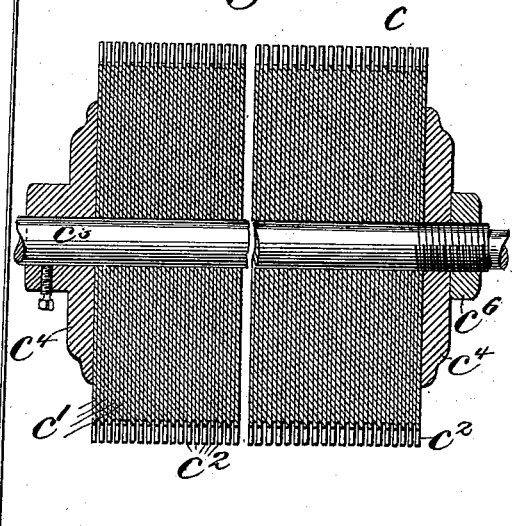
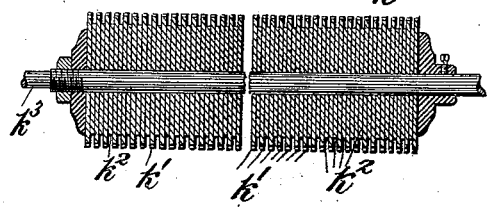
WITNESSES:
INVENTOR
George Pettit Jr.
BY
Henry D. Williams
ATTORNEY

UNITED STATES PATENT OFFICE.

GEORGE PETTIT, JR., OF NEW YORK, N. Y., ASSIGNOR OF ONE-HALF TO JOHN D. SPROMER, OF SAME PLACE.

FRUIT-SEEDING MACHINE.

SPECIFICATION forming part of Letters Patent No. 619,693, dated February 14, 1899.

Application filed January 30, 1896. Serial No. 577,386. (No model.)

*To all whom it may concern:*

Be it known that I, GEORGE PETTIT, Jr., a citizen of the United States, and a resident of the city of New York, (Brooklyn,) county of Kings, State of New York, have invented certain new and useful Improvements in Fruit-Seeding Machines, of which the following is a specification, reference being had to the accompanying drawings, forming part thereof.

This invention relates to mechanism adapted for separating and removing the seeds from fruit, especially from dried fruit, such as raisins and currants, and the mechanism hereinafter described embodying this invention is particularly adapted for seeding or separating and removing the seeds from raisins.

It has heretofore been proposed to remove the seeds from dried fruit by impaling the fruit upon a number of teeth placed so closely together as to exclude the seeds, whereby the seeds are retained upon the points of the teeth as the fruit is forced down below these points, and to force or impale the fruit upon the teeth and extract the seeds therefrom in the manner above described by an elastic or rubber roller rolling in contact with the impaling-teeth, and to remove the seeds from the points of the teeth by a fixed blade, and to remove the seeded fruit from the impaling-teeth by a comb-like stripper. According to my invention closely-spaced impaling-teeth are employed having the same function as that above described, and pressing means are employed to impale the fruit upon these teeth and force it down upon the teeth, leaving the seeds upon the points of the teeth, and I have found that the adherence of the fruit to the pressing means, which would ordinarily constitute a serious objection to the use of such means, can be prevented by applying moisture to the seeding devices, and that the slight moistening of the surface of the raisins which results is not only not detrimental, but a positive advantage, softening the berries and tending to clean their surfaces.

In the machine embodying my invention hereinafter described I have employed elastic yielding-surfaced rollers as the pressing means for impaling the fruit upon the closely-spaced impaling-teeth, and the surfaces of these elastic rollers are kept in a moist condition, and the moisture is applied to the surface of the first of a series of rollers acting successively to press the fruit down upon the impaling-teeth, and this effectually prevents the rollers from being gummed and from picking up the berries or pulling them off the impaling-teeth to any objectionable extent.

One of the most difficult operations in a machine of the character described is the complete and successful removal of the seeds from the points of the impaling-teeth. A small amount of the gummy pulp of the fruit necessarily remains upon the seeds and causes them to adhere to the points of the impaling-teeth and also to adhere to any stripper acting to remove them from the points of the impaling-teeth, so that it is necessary not only to effectively remove the seeds from the impaling-points without disturbing the fruit on these teeth, but also to provide a seed-stripping mechanism that can be kept free and clear of seeds. According to my invention this is accomplished by a drum or cylinder having a series of narrow teeth or points and rotated rapidly, so that its teeth or points will move at high velocity just clear of contact with the points of the impaling-teeth, and the stripping drum or cylinder is kept clean by the action of centrifugal force and by the stripping action of a comb entering between the points or teeth of the stripping-drum. The centrifugal action would, however, be but slightly effective with dry surfaces by reason of the gummy substances; but I provide means for directly moistening the surfaces of the stripping-drum, and this stripping-drum in moist condition and moving at high velocity and working against the cleaning-comb performs the work of removing the seeds from the points of the carrier in a highly effective and satisfactory manner.

My invention also includes various improvements in construction set forth in the claims, all of which improvements will now be particularly set forth in a description of the seeding-machine shown in the accompanying drawings embodying my invention.

Figure 1:
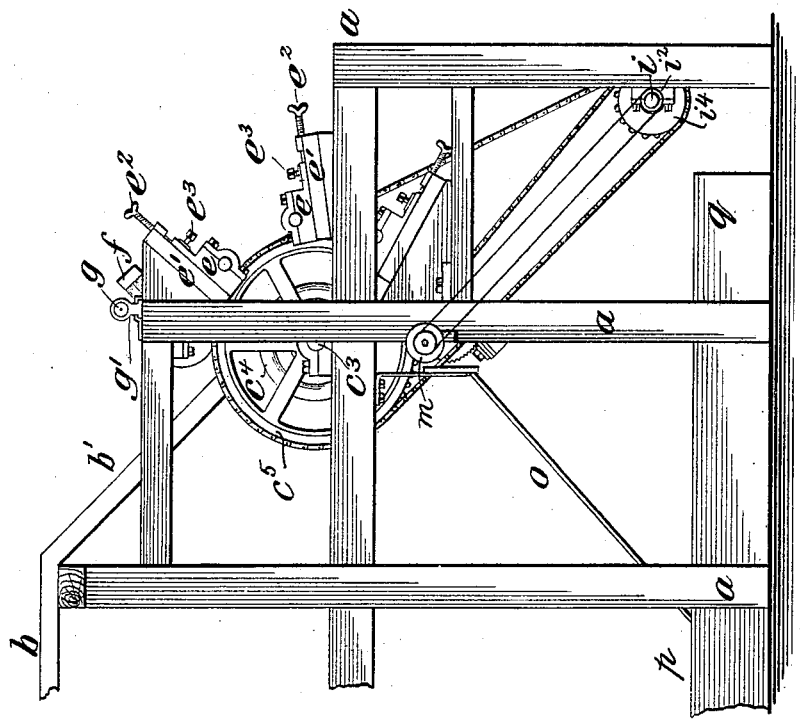

Figure 1 is a side elevation of the complete machine. Fig. 2 is a front elevation of the same. Fig. 3 is a longitudinal vertical central section of the same. Fig. 4 is a detached elevation of portions of one of the stripper-combs enlarged. Fig. 5 is an enlarged detached cross-section of part of the main cylinder or carrier having the spaced impaling-teeth thereon. Fig. 6 is a longitudinal section similar to Fig. 3, but enlarged and showing only the carrier and adjacent parts. Fig. 7 is a front elevation, also enlarged, of the right-hand portion of the machine. Fig. 8 is an enlarged longitudinal section of the main cylinder or carrier. Fig. 9 is an enlarged longitudinal section of the seed-stripping cylinder.

The main frame of the machine may be of any suitable construction and is shown as made up of side frames $a\ a$, joined by cross-bars $a'\ a'$ of a construction such as is usually adopted in wooden frames, and the bearings of the various revolving shafts of the machine are shown as formed in metal blocks or bearing-pieces secured upon or adjustably held relatively to the main frame.

As the machine constructed as shown is particularly adapted for seeding raisins, I will describe it as used for that purpose, it being of course understood that my invention is not limited to a machine for seeding raisins.

The raisins are fed into the machine, preferably by hand, from the feed-board $b$ onto the inclined chute $b'$, down which they slide to the carrier $c$. The carrier $c$ is shown as a cylinder fitted to rotate in bearings in the frame and has a surface made up of a number of impaling-teeth placed so closely together as to exclude the seeds of the raisins, but of such construction that the raisins when pushed inward and thus separated from their seeds may be readily impaled thereon. This carrier-cylinder $c$ is made up of a number of disks $c'$ and $c^2$, (see Figs. 5 and 8,) the disks $c'$ being provided with impaling-teeth spaced apart at the proper distance on circumferential lines and the disks $c$ being of smaller diameter and having plain peripheries and being arranged alternately with the toothed disks $c'$ and of such thickness as to space the teeth at the proper distance apart on longitudinal lines. These disks are mounted upon a shaft $c^3$, and each disk is held from rotation by a projection entering a groove in said shaft or may be keyed to the shaft, and clamping-plates $c^4$ are provided, one at each end of the series of disks, the left-hand clamping-plate $c^4$ being fixed upon the shaft and the right-hand clamping-plate $c^4$ being tightly pressed against the disks, so as to hold them together longitudinally by means of the adjusting-nut $c^6$, threaded upon the shaft $c^3$.

The means for impaling the fruit upon the teeth of the carrier-cylinder consist of a series of elastic or rubber rollers rolling in contact with the carrier-cylinder and acting successively to force the raisins down upon the impaling-teeth below the points or the surface of the carrier, leaving the seeds upon these points. The number of these rollers, as shown, is four, and they are lettered $d'$, $d^2$, $d^3$, and $d^4$, respectively, and I have obtained excellent results with this number of rollers; but a greater or less number of rollers may be employed, as desired. These rollers all act in substantially the same manner, and the rapidity of operation upon each raisin depends upon the resistance offered by each raisin. The first roller $d'$ is adjusted so as to exert a comparatively light pressure upon the raisins passing thereunder, the second exerts a greater pressure than the first or is closer to the carrier, and so on, the fourth roller exerting the greatest pressure or being closest to the carrier. The rollers $d'$ $d^2$ $d^3$ $d^4$ are preferably made up of thick rubber tubes secured upon metal shafts, and the shafts of the rollers $d^2$ $d^3$ $d^4$ are fitted to rotate in adjustable bearing-blocks $e$, movable on beds $e'$ and having adjusting-screws $e^2$ and clamping-screws $e^3$, and the shaft of the roller $d'$ has a suitable adjustable bearing, and by this means the rollers may be nicely adjusted to exert the desired pressure upon the raisins carried by the main cylinder or carrier $c$.

The means above referred to for moistening the rollers are shown as consisting of a drip-pipe $g$ and a brush $f$, the brush $f$ being held in the frame in contact with the first rubber roller $d'$ throughout the length of said roller and this brush being below the drip-pipe $g$, so that the fluid from the drip-pipe drops upon the brush. The drip-pipe $g$ may be connected with an ordinary water-pipe or may be connected with a water-tank or water-reservoir and is provided with small drip-orifices throughout its length. To insure a uniform distribution of the water throughout the length of the brush, means are provided for reciprocating the drip-pipe $g$ transversely of the machine, such means being shown as a crank-disk $h$, joined by a connecting-rod $h'$ to the drip-pipe $g$ and connected by an endless belt or cord with a pulley $i'$ on the main driving-shaft $i$. The drip-pipe $g$ is supported at its ends in standards $g'\ g'$, fitted to slide on the frame.

The seed-stripping cylinder or drum $k$ is shown as made up of disks in a similar manner to the main cylinder or carrier, toothed disks $k'$ alternating with plain disks $k^2$, (see Fig. 9,) the latter of smaller diameter than the former; but the teeth of the disks $k'$ are preferably of tapering or triangular profile (see Fig. 6) and have their edges preferably finished at right angles to the faces of the disks, so as to successively present to the seeds on the carrier a number of narrow knife-edges substantially at right angles to the direction of movement of these stripping-teeth, and, as in the carrier-cylinder, the plain disks $k^2$ space the toothed disks $k'$ at suitable distances apart longitudinally of the cylinder; but in this case the spacing of the toothed disks apart is mainly for the entrance of the teeth of the fixed cleaning or stripping comb $j$, which is shown as arranged below the seed-stripping cylinder $k$, with its teeth entering the annular or circumferential grooves between the toothed disks $k'$, and which will be hereinafter particularly described. The disks $k'$ and $k^2$ may be keyed to the seed-stripper shaft $k^3$ or, as shown, each disk may have a projection entering a groove in said shaft to hold the disks from rotation relatively to said shaft, and clamping-plates and a nut are provided of substantially the same construction as the corresponding parts above described of the carrier-cylinder $c$. The seed-stripping cylinder $k$ is preferably adjusted so that the points of its teeth will be just clear of contact with the teeth of the carrier-cylinder $c$, or the points of the teeth of the seed-stripping cylinder will rotate in circles external to the circles of rotation of the points of the teeth of the carrier-cylinder. The moistening of this seed-stripping cylinder $k$ is effected through a spraying-pipe $l$, placed over the seed-stripping cylinder $k$ and connected with a water-pipe or source of water and having suitable escape-orifices along its length, and to provide for a uniform distribution of the water over the surfaces of the seed-stripping cylinder a reciprocating movement is imparted to this spraying-pipe through the crown-cam $m$ on a pulley connected by a belt with a pulley $i^2$ on the shaft $i$, said cam $m$ working against a roller on the end of the spraying-pipe $l$ and a spring $m'$ holding the roller against the cam-surface. It is of course evident that the automatic spraying mechanism such as just described and the automatic mechanism for moistening the elastic presser-rollers may be omitted and these parts moistened by hand.

The seed-stripping cylinder $k$ is rotated at a comparatively high speed in such direction that its upper surface moves forward, whereas the adjacent lower surface of the carrier-cylinder $c$ moves rearward, and thus these adjacent surfaces move in opposite directions, and the seeds upon the carrier-cylinder receive a large number of quick blows in rapid succession and are effectively dislodged and removed from the carrier-cylinder. The centrifugal force resulting from the high speed of the seed-stripping cylinder, in conjunction with the moistening of its surfaces, causes a considerable amount of the gummy material and some of the seeds to be thrown off from the surfaces of the seed-stripping cylinder, and any adhering seeds will be removed by the comb $j$. The seeds fall into the seed-receptacle $q$, guard-plates $q'$ (shown only in Fig. 3) being provided to receive any material thrown off from the seed-stripping cylinder.

The removal of the seeded raisins from the carrier-cylinder is effected by a fixed comb $n$ of improved construction. This comb $n$ is provided with teeth $n^2$, which enter the annular or circumferential grooves between the toothed disks $c'$ of the carrier and push the seeded raisins outward and off from the impaling-teeth, and the seeded raisins fall upon the inclined sieve $o$ and slide down the same and into the raisin-receptacle $p$, the sieve separating therefrom small particles of seeds or foreign material that may have escaped the seed-stripping cylinder and any such small particles fall into the seed-receptacle $q$.

The fixed fruit-stripping comb $n$ of the carrier and the fixed seed-stripping comb $j$ of the seed-stripping cylinder are of substantially the same construction, differing only in the length of their comb-teeth. I will therefore describe particularly only the fruit-stripping comb $n$, and this description will apply equally well to the seed-stripping comb $j$. Each of the teeth $n^2$ of this comb is a separate blade, quite thin and wide, and placed edgewise, so that it has considerable strength in the direction of strain, and these separate blades fit into separate grooves formed in a rigid backing-plate $n'$, the depth of the grooves in the backing-plate being slightly less than the width of the comb-teeth $n^2$, so that the edges of the comb-teeth project above the face of the backing-plate. (See Fig. 4.) A clamping-plate $n^3$ is provided for holding the teeth in the backing-plate, and interposed between this clamping-plate and the face of the backing-plate and projecting edges of the comb-teeth is a yielding plate $n^4$, preferably of rubber. Bolts or studs and nuts $n^5$ press the clamping-plate $n^3$ toward the backing-plate $n'$ and cause the yielding plate $n^4$ to press tightly against the projecting edges of the comb-teeth, and this yielding plate adjusts itself to any slight variations of width of comb-teeth or depth of grooves in the backing-plate, and thus each individual comb-tooth is firmly gripped and held. With this construction any comb-tooth that has been worn out or broken may be readily replaced, or all comb-teeth may be taken out and a new set inserted. These comb-teeth are necessarily subjected to considerable wear and must be occasionally thoroughly cleansed, and hence this construction is highly advantageous.

Power is applied to the machine in the construction shown at the main driving-shaft $i$ in the front lower portion of the machine, fast and loose pulleys $i^3$ being shown to receive the power. The carrier-shaft $c^3$ is driven from the main shaft $i$ through a chain running over a sprocket-wheel $i^4$ on shaft $i$ and a larger sprocket $c^5$ on the carrier-shaft $i^3$. The seed-stripping cylinder-shaft $k^3$ is driven from the main shaft $i$ by a chain running over a sprocket-wheel $i^5$ on shaft $i$ and a smaller sprocket-wheel $k^5$ on shaft $k^3$. The elastic rollers $d'$, $d^2$, $d^3$, and $d^4$ are driven by contact with the carrier or raisins carried thereby. The crank-disk $h$ and the crown-cam $m$ are driven from the main shaft, as heretofore described.

It is of course evident that other means than that shown or other arrangements of the same means may be employed for imparting motion to the different parts of the machine, and that various modifications may be made in the construction shown in the drawings and above particularly described within the purview of my invention, and that parts of my invention may be used separately or in combination with other parts of different construction from that above described or shown.

What I claim as my invention, and desire to secure by Letters Patent, is—

1. In a machine for seeding fruit, in combination, a carrier having a series of impaling-teeth spaced so as to exclude the seeds of the fruit, elastic yielding-surfaced rollers acting to press the fruit below the surface of said impaling-teeth, leaving the seeds on the points thereof, and means for moistening said rollers, substantially as set forth.

2. A machine for seeding fruit comprising a carrier having a series of impaling-teeth spaced so as to exclude the seeds of the fruit, elastic yielding-surfaced rollers, acting to press the fruit below the surface of said impaling-teeth leaving the seeds on the points thereof, means for moistening said rollers, a seed-stripping device, and a fruit-stripping device, substantially as set forth.

3. In a machine for seeding fruit, in combination, a carrier having a series of impaling-teeth spaced so as to exclude the seeds of the fruit, elastic yielding-surfaced rollers acting to press the fruit below the surface of said impaling-teeth leaving the seeds on the points thereof, and a moistening-brush in contact with the first of said rollers, and means for moistening said brush, substantially as set forth.

4. In a machine for seeding fruit, in combination, a carrier having a series of impaling-teeth spaced so as to exclude the seeds of the fruit, elastic yielding-surfaced rollers acting to press the fruit on said impaling-teeth, a moistening-brush in contact with the first of said rollers, and a reciprocating drip-pipe for moistening said brush, substantially as set forth.

5. A machine for seeding fruit comprising a carrier having a series of impaling-teeth spaced so as to exclude the seeds of the fruit, pressing means for impaling the fruit on said teeth leaving the separated seeds on the points of the teeth, a seed-stripper provided with a series of teeth and having motion at high velocity relatively to the carrier and acting to remove the separated seeds from said carrier, and a fruit-stripping device, substantially as set forth.

6. In a machine for seeding fruit, in combination, a carrier having a series of impaling-teeth spaced so as to exclude the seeds of the fruit, pressing means for impaling the fruit on said teeth leaving the seeds on the points of the teeth, and a toothed seed-stripping cylinder arranged to rotate with the points of its teeth in circles external to the circles of rotation of the points of the impaling-teeth, and acting to remove the separated seeds from said carrier, substantially as set forth.

7. In a machine for seeding fruit, in combination, a carrier having a series of impaling-teeth spaced so as to exclude the seeds of the fruit, pressing means for impaling the fruit on said teeth leaving the seeds on the points of the teeth, a seed-stripping cylinder having a series of narrow teeth arranged to leave circumferential grooves or spaces and a cleaning-comb having teeth entering said grooves, substantially as set forth.

8. In a machine for seeding fruit, in combination, a carrier having a series of impaling-teeth spaced so as to exclude the seeds of the fruit, pressing means for impaling the fruit on said teeth leaving the seeds on the points of the teeth, a toothed seed-stripping cylinder acting to remove the separated seeds from said carrier, and means for moistening said seed-stripping cylinder, substantially as set forth.

9. In a machine for seeding fruit, in combination, a carrier having a series of impaling-teeth spaced so as to exclude the seeds of the fruit, pressing means for impaling the fruit on said teeth leaving the seeds on the points of the teeth, a seed-stripping cylinder having a series of narrow teeth arranged to leave circumferential grooves or spaces, a cleaning-comb having teeth entering said grooves, and a spraying-pipe for moistening said seed-stripping cylinder, substantially as set forth.

10. In a machine for seeding fruit, in combination, a carrier having a series of impaling-teeth spaced so as to exclude the seeds of the fruit, pressing means for impaling the fruit on said teeth leaving the seeds on the points of the teeth, a toothed seed-stripping cylinder acting to remove the separated seeds from said carrier, and a reciprocating spraying-pipe for moistening said seed-stripping cylinder, substantially as set forth.

11. In a machine for seeding fruit a stripping-comb comprising a grooved backing-plate, a series of separate blades entering said grooves in the backing-plate but with their longitudinal edges projecting slightly beyond the face of the backing-plate, a clamping-plate and yielding elastic material intervening between the clamping-plate and the face of the backing-plate and exposed edges of the blades, substantially as set forth.

12. In a machine for seeding fruit, in combination, a carrier having a series of impaling-teeth spaced so as to exclude the seeds of the fruit, elastic yielding-surfaced rollers acting to press the fruit on said impaling-teeth, means for moistening said rollers, a toothed seed-stripping cylinder acting to remove the separated seeds from said carrier, and means for moistening said seed-stripping cylinder, substantially as set forth.

13. A machine for seeding fruit comprising a carrier having a series of impaling-teeth spaced so as to exclude the seeds of the fruit, elastic yielding-surfaced rollers acting to press the fruit on said impaling-teeth, means for moistening said rollers, a seed-stripping cylinder having a series of narrow teeth arranged to leave circumferential grooves or spaces, a cleaning-comb having teeth entering said grooves, and a fruit-stripping device, substantially as set forth.

14. In a fruit-seeding machine, the combination with a carrier, of a seed-stripping cylinder for removing the seeds therefrom, means for rotating said seed-stripping cylinder at high velocity so as to throw off foreign matter by centrifugal force, and means for moistening said seed-stripping cylinder, substantially as set forth.

15. In a fruit-seeding machine a seed-stripping cylinder having a series of narrow teeth arranged to leave circumferential grooves or spaces, in combination with a cleaning-comb entering said grooves, substantially as set forth.

16. In a fruit-seeding machine, a seed-stripping cylinder and means for rotating the same at high velocity in combination with a carrier having impaling-teeth spaced so as to exclude the seeds of the fruit, and pressing means for impaling the fruit on said carrier leaving the seeds on the points of the teeth, substantially as set forth.

17. A machine for seeding fruit comprising a cylindrical carrier composed of thin plates of two constructions arranged alternately, the plates of one construction having long teeth spaced apart circumferentially so as to exclude the seeds of the fruit, and the plates of the other construction being of smaller diameter and smooth circular contour and of such thickness as to exclude the seeds of the raisins, pressing means for impaling the fruit on such teeth, a seed-stripping device and a fruit-stripping device, substantially as set forth.

18. In a machine for seeding fruit, seeding devices comprising a carrier having a series of impaling-teeth spaced so as to exclude the seeds of the fruit, and impaling means acting to press the fruit below the surface of said impaling-teeth leaving the seeds on the points thereof, in combination with means for moistening such seeding devices, substantially as set forth.

This specification signed and witnessed this 28th day of January, 1896.

GEORGE PETTIT, JR.

In presence of—
 HENRY D. WILLIAMS,
 HERBERT H. GIBBS.